(12) United States Patent
Ksiezopolski

(10) Patent No.: US 9,033,390 B1
(45) Date of Patent: May 19, 2015

(54) EDGE SEAL WITH SIDEWALL SEAL

(71) Applicant: LIFETIME INDUSTRIES, INC., Elkhart, IN (US)

(72) Inventor: Edwin E Ksiezopolski, Granger, IN (US)

(*) Notice: Subject to any disclaimer, the term of this patent is extended or adjusted under 35 U.S.C. 154(b) by 0 days.

(21) Appl. No.: 14/242,002

(22) Filed: Apr. 1, 2014

(51) Int. Cl.
*B60P 3/34* (2006.01)
*B60R 13/06* (2006.01)

(52) U.S. Cl.
CPC .. *B60R 13/06* (2013.01); *B60P 3/34* (2013.01)

(58) Field of Classification Search
CPC .... B60P 3/34; F21Y 2103/00; B60J 10/0031; B60J 10/08; B60J 10/0062; Y10T 29/49622; B60R 13/06; E02F 9/163; E05Y 2900/518
USPC ........ 296/26.13, 165, 171, 175, 26.11, 26.12, 296/164, 26.01, 26.09
See application file for complete search history.

(56) References Cited

U.S. PATENT DOCUMENTS

| | | | |
|---|---|---|---|
| 6,900,603 B1* | 5/2005 | Del Vecchio | 318/16 |
| 6,966,590 B1* | 11/2005 | Ksiezopolki et al. | 296/26.01 |
| 7,540,116 B1* | 6/2009 | Martinson | 52/67 |
| 8,408,625 B1* | 4/2013 | Ksiezopolski et al. | 296/26.09 |
| 8,701,351 B2* | 4/2014 | Siegel | 49/490.1 |
| 2002/0043813 A1* | 4/2002 | McManus et al. | 296/26.13 |
| 2006/0091687 A1* | 5/2006 | Schoffner et al. | 296/26.01 |
| 2008/0048464 A1* | 2/2008 | Ksiezopolski et al. | 296/26.01 |
| 2008/0073925 A1* | 3/2008 | Ksiezopolski et al. | 296/26.01 |
| 2011/0025091 A1* | 2/2011 | Schwindaman et al. | 296/171 |
| 2012/0032406 A1* | 2/2012 | Ksiezopolski et al. | 277/648 |
| 2013/0106130 A1* | 5/2013 | Yoder et al. | 296/26.02 |
| 2013/0269262 A1* | 10/2013 | Siegel | 49/492.1 |
| 2014/0001710 A1* | 1/2014 | Siegel | 277/630 |
| 2014/0097578 A1* | 4/2014 | Young et al. | 277/628 |
| 2014/0175822 A1* | 6/2014 | Kreil | 296/26.13 |
| 2014/0203522 A1* | 7/2014 | Ksiezopolski | 277/634 |
| 2014/0225333 A1* | 8/2014 | Siegel | 277/630 |
| 2015/0040700 A1* | 2/2015 | Walls | 74/89.17 |

* cited by examiner

*Primary Examiner* — Kiran B Patel
(74) *Attorney, Agent, or Firm* — Botkin & Hall, LLP

(57) ABSTRACT

A resilient seal for mobile living quarters around a slide out room that includes a pair of mounting portions extending along the inside and outside surfaces of the main living area wall at an aperture through which the slide out room moves and further includes a connecting member extending between the attaching members and along the edge of the wall defining the aperture. A wiper seal extends from the connecting member to flex against the walls of the slide out room, and the mounting portion further includes a lip seal for accommodating walls of different thicknesses.

4 Claims, 4 Drawing Sheets

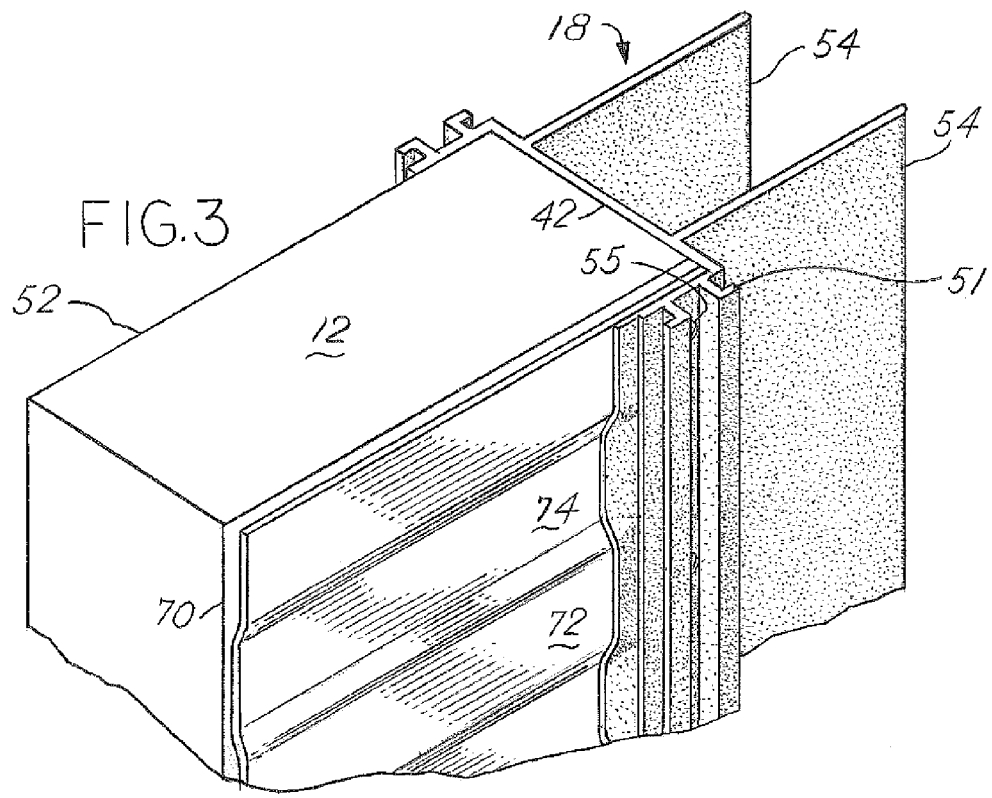
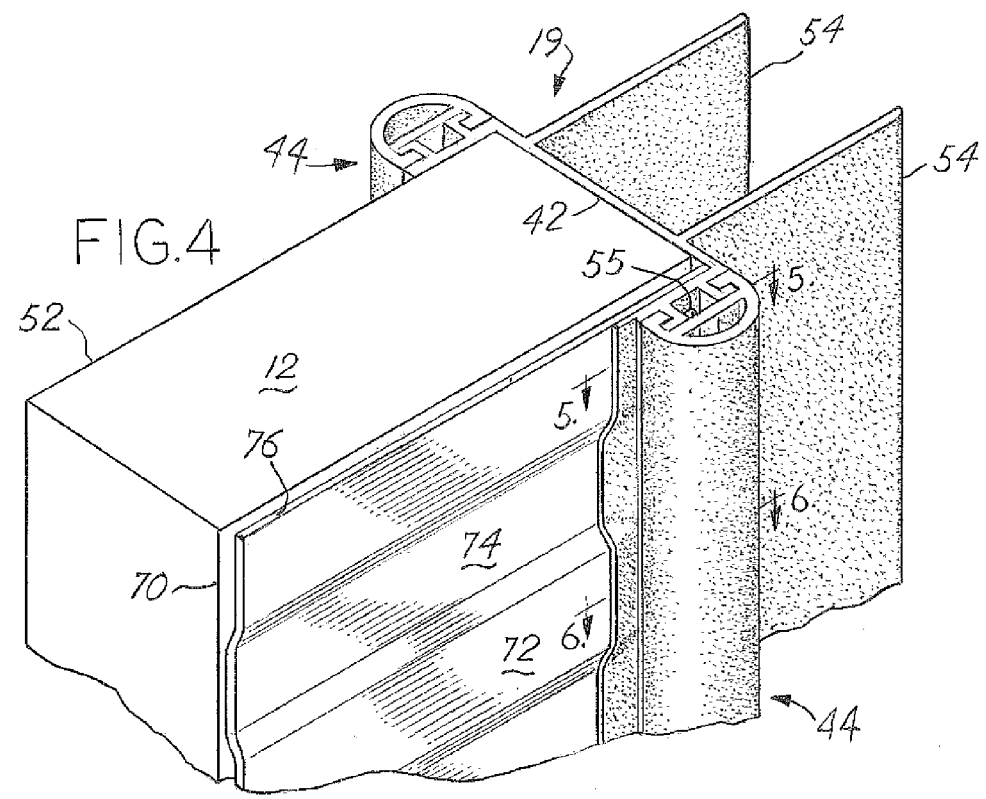

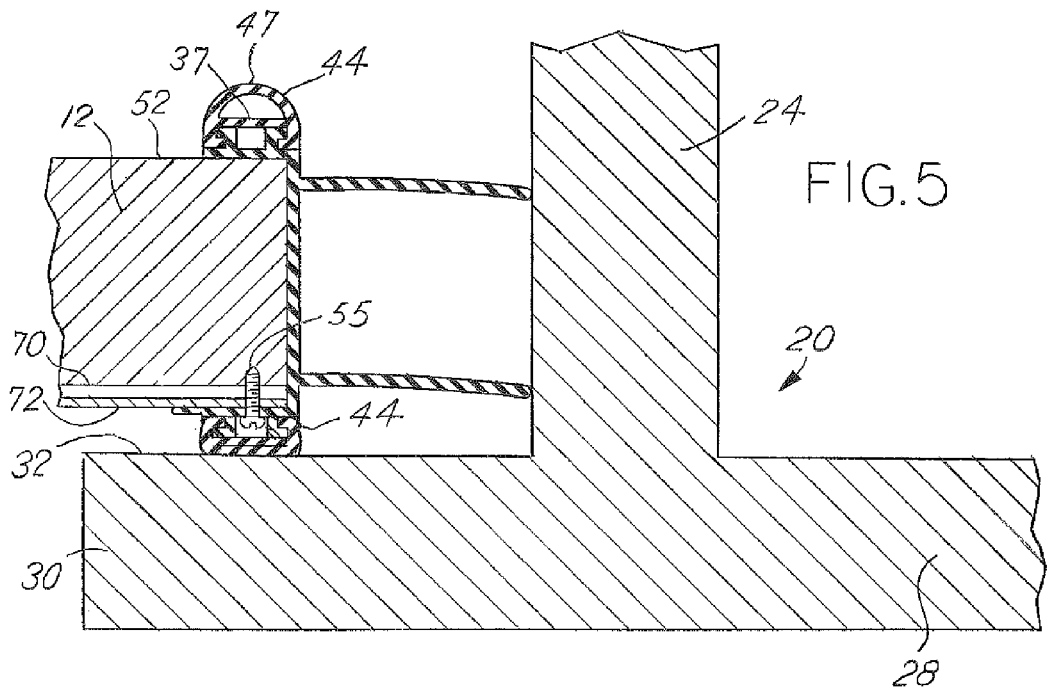
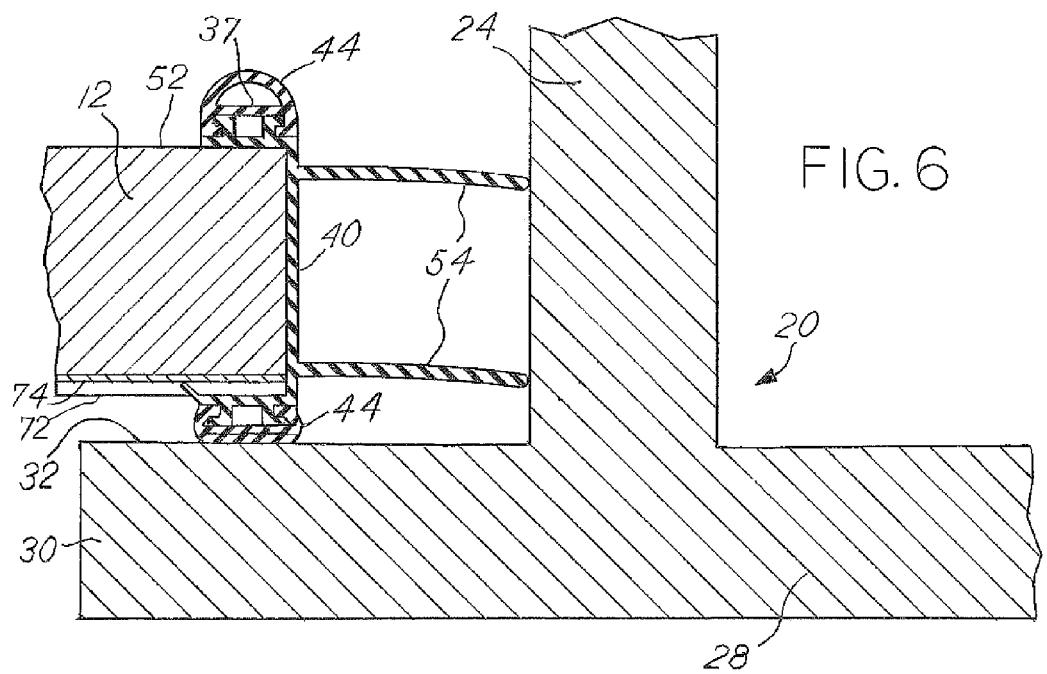

EDGE SEAL WITH SIDEWALL SEAL

BACKGROUND OF THE INVENTION

Recreational vehicles such as motor homes and travel trailers are commonly equipped with one or more slide out rooms that are retracted within the main living quarters when the unit is transported, but can be extended from the main living quarters to provide auxiliary space when the unit is parked. Commonly, bulb seals extend around the aperture defined in the outside of the sidewall of the main living quarters through which the slide out room extends and retracts. This seal is engaged by a first flange on the exterior side of the slide out room to seal the gap between the slide out room and the main living quarters when the slide out room is retracted. Similarly, a second bulb seal extends around the aperture on the inside of the sidewall and is engaged by a second flange on the interior side of the slide out room when the slide out room is extended for use. Wiper seals are mounted on sidewalls adjacent to the aperture and are flexed against corresponding walls of the slide out room. The bulb seals seal the slide out room in the extended and retracted positions, and the wiper seal wipes against the slide out room as it is extended and retracted to prevent moisture and debris from entering the vehicle. While the seals of the aforementioned patents accomplished their task successfully, there were issues with sealing to an outside wall that is ribbed or patterned. Seals are most inexpensively produced from a single extrusion, making a cross sectional shape relatively easy, but lengthwise features nearly impossible. Affixing a seal to the non-movable part of the room meant additional sealing compound needed to be added to fill in gaps between the seal and the mounting surface. Ideally, a single seal installed without additional steps or materials would simplify installation.

SUMMARY OF THE INVENTION

According to the invention, a resilient seal for mobile living quarters is provided for sealing around a slide out room of mobile living quarters having an aperture slidably receiving a slide out room. The resilient seal has a pair of attaching members extending along the inside and outside surfaces of the main living area wall at the aperture and further include a connecting member extending between the attaching members and along the edge of the wall defining the aperture. A flipper extends from an attaching member such that the seal maintains contact with different thicknesses of the main living quarter walls. The flipper flattens out with a thicker portion of the wall, and it extends inwardly to meet up with a thinner portion.

BRIEF DESCRIPTION OF THE DRAWINGS

FIG. 3 is a perspective view of the seal base installed on a sidewall;

FIG. 4 is a perspective view of the seal structure fully installed on a sidewall;

FIG. 5 is a section view 5-5 of the seal shown in FIG. 4 with the slide out room retracted;

FIG. 6 is a section view 6-6 of the seal shown in FIG. 4 with the slide out room refracted.

DETAILED DESCRIPTION OF INVENTION

Figure 1:
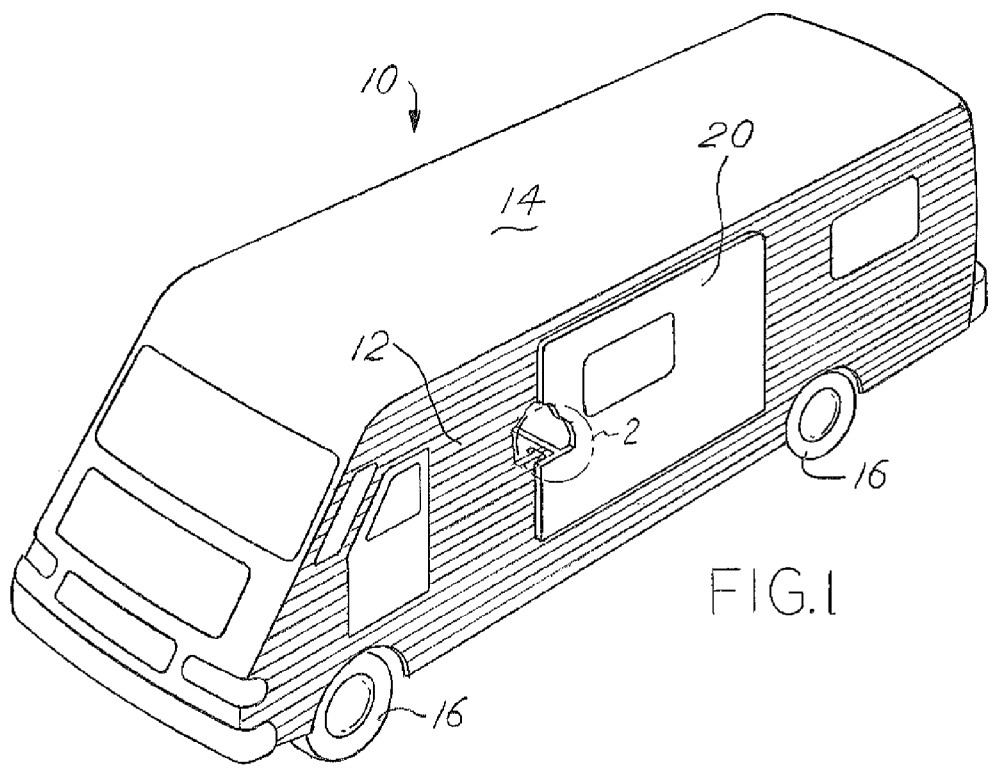
FIG. 1 is a perspective view of the RV.
Figure 2:
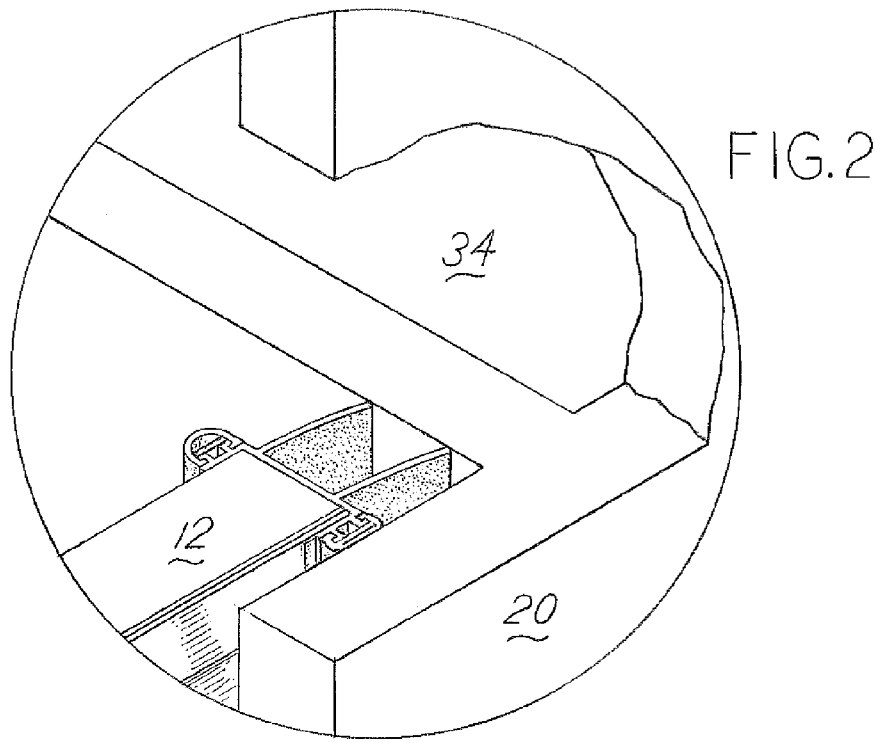
FIG. 2 is a magnified view of area 2 in FIG. 1.

Referring now to the drawings, mobile living quarters, such as the recreational vehicle generally indicated at 10, includes side walls 12 and a ceiling wall 14. The mobile living quarters shown in all FIGS is a recreational vehicle, but can apply to trailers or other spaces where a movable section is desired. The mobile living quarters 10 is mounted on wheels 16 for transport. An aperture is provided in one of the side walls 12 and slidably receives a slide out room 20. This is best seen in the magnified view shown in FIG. 3. The side walls 12 and ceiling wall 14 cooperate to define a main living area. The slide out room 20 includes side walls 24, a ceiling wall, and a front wall 28. As known to those skilled in the art, the slide out room 20 is mounted for movement through the aperture, so that it may be retracted into the main living quarters 22 as is shown in FIG. 1 when the unit is transported, but can be extended from the main living quarters when the unit is parked, thereby providing auxiliary living space. The slide out room 20 includes an exterior flange 30 extending around the side walls 24 and ceiling wall. The exterior flange 30 has an inside surface 32 designed to mate with a seal assembly 19. The slide out room 20 includes another flange, being an interior flange (not shown), extending around the side walls 24 and ceiling wall at the ends thereof opposite the ends joined to the front wall 28. The side walls 24, ceiling wall, and front wall 28 cooperate to define an auxiliary living area 34 FIG. 2, which is available for use when the unit is parked and the slide out room 20 is moved to the extended position.

The sidewall 12 can either be smooth or corrugated. In the RV shown in FIGS. 1-4, the exterior surface of the sidewall is made from corrugated metal 76. The corrugated metal 75 has a proud surface 72 and a recessed surface 74. As shown in FIGS. 3 and 4, the corrugated metal 75 is affixed to the outside of the sidewall 12 and mated to the outer surface 70 of the wall 12.

It is necessary to assure that moisture, dirt, debris, etc. be prevented from entering the living quarters. In FIG. 3 a seal base 18 is installed around the inside perimeter 42 to the aperture and bulb seals 44 are subsequently added to form a seal assembly 19. The seal assembly 19 must provide sealing at the extended position, retracted position, and all intermediate positions. The seal assembly 19 includes bulb seals 44 mounted around the aperture on the exterior surface and the interior surface of the side wall 12 adjacent the aperture, and wiper seals 54 engage the side walls 24 and ceiling wall 26 of the slide out room to wipe against the walls as the slide out room 20 extends and retracts. Preferably, the seal base 18 and bulb seals 44 are made continuously through an extrusion process and is consistent along its entire length, so that an appropriate length can be cut off and installed.

Figure 7:
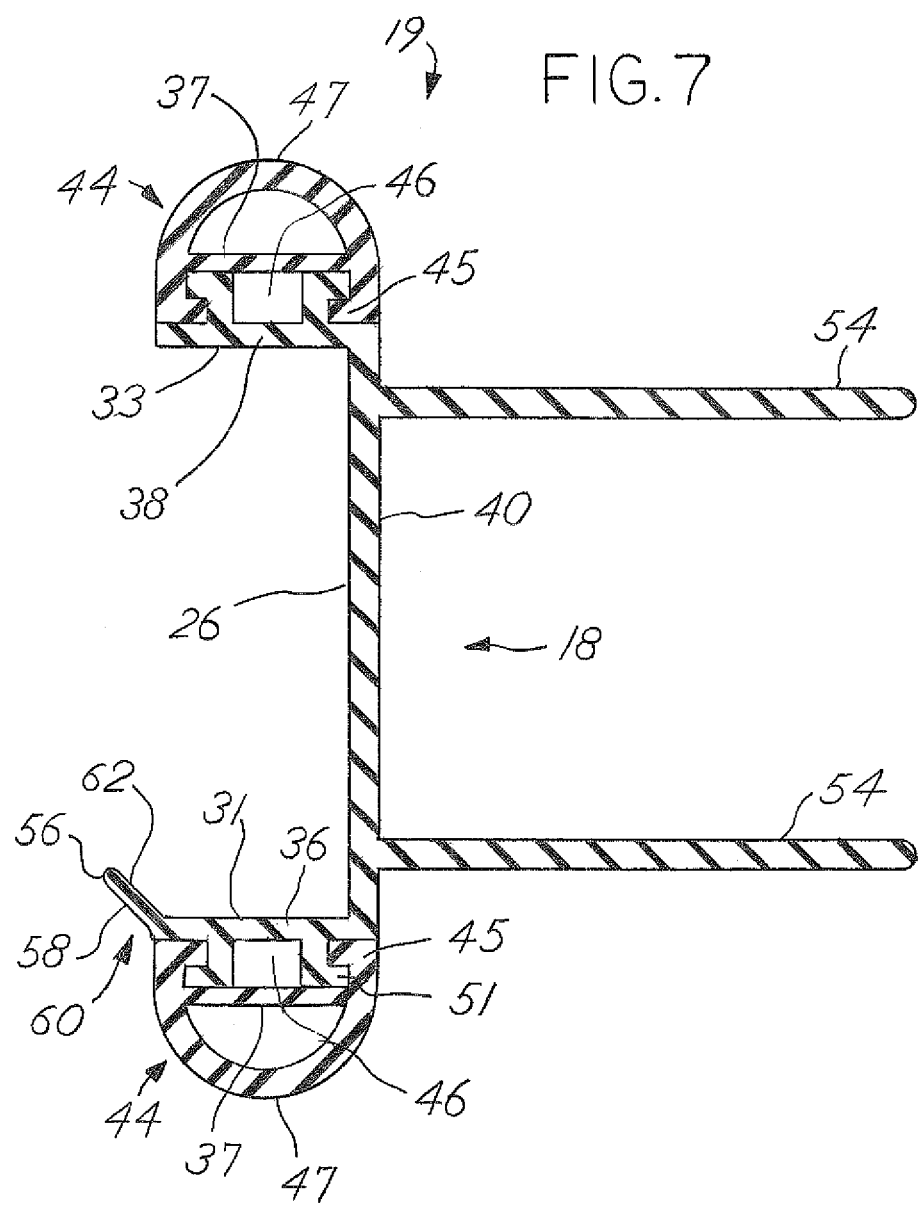
FIG. 7 is a section view of the seal without the sidewall.

FIG. 4 shows the seal assembly 19 in perspective as it is assembled onto a sidewall 12. The seal base 18 has a pair of mounting portion attachment members 36, 38, which are connected by a longitudinal connecting member 40, which extends over the transverse edge 42 FIG. 3 of the sidewall 12. The exterior mounting portion 36 has a mounting surface 31 and the interior mounting portion 38 has a mounting surface 33. The mounting portions 36, 38 include oppositely extending, rail-like outwardly facing tabs 51 which form a tongue. A clip part of the bulb seal 44 includes tabs 45 which form an inwardly facing groove defined by the tabs 45. When the mounting portions 36, 38 and clip part are connected together, the tongues fit into grooves as is shown in FIG. 7. The tabs 45 all extend lengthwise along the bulb seal 44 such that, once fitted together, the bulb seal 44 may be slid along the length of the mounting portion, and are flexible enough to allow them to snap past each other for assembly. It contemplates that the orientation of the tongue and groove can be reversed so that the tongue is on the bulb seal 44 and the groove is on corresponding mounting portions 36, 38. Alternatively, the clip part of the bulb seal portion may be slid into a mounting portion from an end of the seal. Preferably, the bulb seal is constructed such that tabs 45 are more rigid than the wall 47. The bulb seals 44 have a wall 47 that is arcuately shaped. The wall 47 has a consistent thickness as is shown in FIG. 7. The bulb seal 44 has an internal web 37 that connects opposing sides of the wall 47 and is adjacent to the tongue 45. The web 37 prevents the opposing sides of the bulb seal 44 from separating, especially when the bulb seal 44 is compressed against a surface such as inside surface 32 as shown in FIGS. 5 and 6.

The seal base 18 contains a flipper 60 that extends from the exterior mounting portion 36, as shown on FIG. 7. The flipper 60 has a tip 56, an exterior surface 58 and an interior surface 62. The interior surface 62 is adjacent to and intersects the mounting surface 31. The flipper 60 is attached to the exterior mounting portion 36 opposite the connecting member 40 and extending at an obtuse angle therefrom in its relaxed position. The flipper is flexible and is designed to conform to an irregular surface. As is shown in FIG. 4, the flipper flattens out to become substantially parallel to mounting surface 31 when it abuts the proud surface 72. This is particularly true when mounting surface 31 is pressed against a locally planar surface such as the proud surface 72 of the corrugated metal 76. It extends inwardly toward the recessed surface 74. The flipper 60 has sufficient length and resilience for the tip 56 to maintain contact to the proud surface 72, the recessed surface, 74 and any transitional surface between. The flipper prevents gaps between the seal 19 and the sidewall 12 from being created by the varying distance between the proud surface 72, and the recessed surface, 74 and the seal assembly 19. At all locations where the flipper 60 contacts the exterior surface 58, it is in biased contact with the exterior surface 58 due to its resilient nature.

When the slide out room 20 is fully retracted as shown in FIGS. 5 and 6, the bulb seal 44 that is attached to the exterior mounting portion member 36 is compressed against the inside surface 32 of the exterior flange 30. The bulb seal 44 deforms as pressure is formed between the wall 47 and the inside surface 32, as is shown in FIGS. 5 and 6.

To facilitate installation of the seal 19 on the unit 10, the seal base 18 is first wrapped around the sidewall 12 such that transverse edge 42 abuts longitudinal connecting member 40, mounting surface 33 abuts the inner surface 52, mounting surface 31 abuts the proud surface 72 and recessed surface 74. Screws 55 are then driven through exterior mounting portion 36, and interior mounting portion 38 between tongues into 12, preferably on the proud surface 72. Optionally, a strip of double sided adhesive tape is affixed to any desired surface. The opposite side of the adhesive tape is covered by a protective removable coating that prevents it from sticking to anything. Optionally, the seal base 18 includes a strip of double sided adhesive tape attached to it and protected with a protective removable coating on the side that faces the side wall 12. Once the seal base 18 is secured to the sidewall 12, the bulb seals 44 can be installed on each mounting portion 36, 38.

The seal assembly may be easily adapted to fit to different slide-out room configurations by cutting any necessary length. A variety of different corner configurations in the opening may be easily adapted by cutting the bulb seal 44 to a different length than the seal base 18, and the wiper 54 may be cut to a third length if necessary. A variety of different gaps between the mobile living quarter's sidewall and the slide-out room sidewalls may be easily adapted to by adjusting the lateral position of the seal base 18 relative the sidewall or trimming back the flipper 60. By mounting the seal base 18 and the bulb seal 44 to the wall 12, subsequent repair and replacement of worn bulb seals 44 may be easily performed without having to remove the slide out room 20 from the opening in wall 12.

After adhesive tape is optionally attached to the outer surface and inner surface 52 of the side wall 12, the seal assembly 19 may be more securely attached to the corresponding inside and outside surfaces 52 and 50 by appropriate mechanical fasteners. Screws 55 or nails may be driven through the mounting portions 36, 38 into the side wall 12. Wiper seals 54 extend from the connecting portion 40 and are adapted to flex against the side walls 24 and ceiling wall of the slide out room 20 during extension and retraction of the latter. The exterior mounting member 36, and the interior mounting member 38, corresponding tongues, and bulb seal 44 form a pocket 46 that hides mechanical fasteners such as screws 55 driven through the mounting portions 36, 38. FIG. 5 illustrates this.

The present invention is not limited to the details given above, but may be modified within the scope of the following claims.

What is claimed is:

1. A resilient seal for living quarters having main living area walls defining a main living area, an aperture in one of said main living area walls slidably receiving a slide out room having slide out room walls defining auxiliary living space, said main living area wall having an outside surface, an inside surface, and a transverse surface extending between the inside and outside surfaces, said transverse surface defining said aperture, said seal comprising:
    a seal base having a pair of mounting portions extending along said main living area wall adjacent to said aperture, one of said mounting portions including a flipper integrally attached thereto, said flipper integrally connected to and facing away its corresponding mounting portion, a tongue connector being carried by one of said mounting portions; and
    a connecting member extending between said mounting portions of said seal base and along said transverse surface;
    a bulb seal and a groove connector carried by the other of said mounting portions and said bulb seal for releasably facilitating the connection of said bulb seal to said mounting portion, said bulb seal affixed thereto and substantially parallel to said mounting portion, said bulb seal having an arcuate portion and an inner wall being integrally joined so that said bulb seal is hollow.

2. The resilient seal as claimed in claim 1, said flipper having a proximal end attached to said mounting portion opposite said connecting member and distal end opposite said proximal end defining a terminal end of said flipper, said flipper extending outwardly from said mounting portion so that said proximal end is nearer said connecting member and said distal end is relatively farther from said connecting member and said flipper extending inwardly toward said living area.

3. The resilient seal as claimed in claim 2, wherein said connecting member includes a wiper extending substantially perpendicularly therefrom and adapted for engaging one of said slide out room walls.

4. The resilient seal as claimed in claim 3, wherein said inner wall of said bulb seal includes a web extending between opposing sides of said bulb seal such that compression of said bulb seal toward its corresponding mounting portion urges said protrusion to remain affixed to said mounting portion.

* * * * *